United States Patent
Ono

(10) Patent No.: US 8,339,642 B2
(45) Date of Patent: Dec. 25, 2012

(54) APPARATUS, METHOD, AND SYSTEM FOR PROCESSING CHARACTER DATA

(75) Inventor: Akiyoshi Ono, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 922 days.

(21) Appl. No.: 12/379,088

(22) Filed: Feb. 12, 2009

(65) Prior Publication Data

US 2009/0213422 A1 Aug. 27, 2009

(30) Foreign Application Priority Data

Feb. 22, 2008 (JP) ................... 2008-040889
Nov. 14, 2008 (JP) ................... 2008-292382

(51) Int. Cl.
*G06F 3/12* (2006.01)
*G06F 17/00* (2006.01)
*G09G 5/00* (2006.01)

(52) U.S. Cl. ........ 358/1.15; 358/1.13; 358/1.9; 358/2.1; 358/2.99; 358/3.31; 358/1.11; 358/448; 358/462; 358/470; 709/206; 709/218; 709/246; 715/200; 715/209; 715/234; 715/235; 715/243; 715/250; 715/254; 715/255; 715/256; 715/259; 715/268; 715/706; 715/780; 382/137; 382/176; 382/181; 382/187; 382/229; 382/254; 382/260; 382/261; 382/266; 382/269; 382/290; 382/292; 382/301; 345/17; 345/26; 345/418; 345/467; 345/469; 345/470; 345/471; 345/472; 345/530; 345/551; 345/581

(58) Field of Classification Search ........................ None
See application file for complete search history.

(56) References Cited

U.S. PATENT DOCUMENTS

| | | | | |
|---|---|---|---|---|
| 7,630,581 | B2 * | 12/2009 | Kojima et al. | 382/290 |
| 7,689,037 | B2 * | 3/2010 | Handley et al. | 382/173 |
| 8,208,531 | B2 * | 6/2012 | Uchimura et al. | 375/240 |
| 2001/0042078 | A1 * | 11/2001 | Anwar | 707/500 |
| 2003/0095135 | A1 * | 5/2003 | Kaasila et al. | 345/613 |
| 2003/0126553 | A1 * | 7/2003 | Nagata | 715/500 |
| 2007/0171446 | A1 * | 7/2007 | Yamamoto et al. | 358/1.11 |
| 2008/0100624 | A1 * | 5/2008 | Matsunaga | 345/469.1 |

FOREIGN PATENT DOCUMENTS

JP 09-062849 3/1997

* cited by examiner

*Primary Examiner* — Steven Kau
(74) *Attorney, Agent, or Firm* — Harness, Dickey & Pierce, P.L.C.

(57) ABSTRACT

An apparatus, method, and system for processing character data is provided, which selects a format of the character data to be used for generating print data. When a user instruction for printing character data according to character command data specifying the output of the character data is received, the format of the character data is selected based on the character command data.

14 Claims, 9 Drawing Sheets

APPARATUS, METHOD, AND SYSTEM FOR PROCESSING CHARACTER DATA

CROSS-REFERENCE TO RELATED APPLICATIONS

This patent application is based on and claims priority under 35 U.S.C. §119 to Japanese Patent Application Nos. 2008-40889 filed on Feb. 22, 2008, and 2008-292382 filed on Nov. 14, 2008, in the Japanese Patent Office, the disclosure of which is hereby incorporated herein by reference.

FIELD OF THE INVENTION

The present invention generally relates to an apparatus, method, and system for processing character data, and more specifically to an apparatus, method, and system for selecting a format of character data to be used for generating print data.

BACKGROUND

In order to print character data generated by a personal computer, the personal computer sends print data including character data and control data to a printer that is connected to the personal computer through a network.

Generally, the personal computer is provided with a driver, such as a graphic device interface (GDI), which outputs the character data to be printed to a printer driver. The printer driver generates print data using the character data. In such case, the GDI provides the character data in a predetermined format, for example, in the form of bitmap font data or in the form of outline font data. However, determining a format of character data to be used has been difficult.

For example, when considering the visual quality of the character image to be output, the format to be used may differ depending on the size of the character to be output. When the character is to be printed at large sizes, the use of bitmap font data illustrated in FIG. 11B should be discouraged as it may increase jagginess or blurriness of the output character image. When the character is to be printed at small sizes, the use of outline font data illustrated in FIG. 11A should be discouraged as it may cause a portion of the output character image to be not clearly shown.

In view of the above, various techniques have been introduced to improve the visual quality of the character image, for example, as described in the Japanese Patent Application Publication No. H09-62849.

SUMMARY

Example embodiments of the present invention include a method of processing character data to be printed by a printer, the method including: receiving, through a user interface, a user instruction for printing character data according to character command data specifying the output of the character data; obtaining the character command data; selecting a format of the character data to be used for generating the output of the character data based on the character command data; and requesting the character data having the selected format.

Example embodiments of the present invention include a character data processing apparatus, which receives a user instruction for printing character data according to character command data specifying the output of the character data; obtains the character command data; selects a format of the character data to be used for generating the output of the character data based on the character command data; and requests the character data having the selected format.

Example embodiments of the present invention include a system for processing character data, which includes a character data processing apparatus and a printer, which are connected, for example, through a network. The character data processing apparatus includes a user interface to receive a user instruction for printing the character data according to character command data specifying the output of the character data. The character data processing apparatus further includes a processor, which obtains the character command data; selects a format of the character data to be used for generating the output of the character data based on the character command data; requests the character data having the selected format; obtains the character data having the selected format; converts the character data having the selected format according to the character command data to generate converted character data having the selected format; and generates the print data including the converted character data having the selected format. The printer receives the print data from the character data processing apparatus via the network, and generates the printed output of the print data.

Example embodiments of the present invention include a computer readable recording medium which stores instructions of a printer driver which uses a computer to perform a method of processing character data, the method including: receiving, through a user interface, a user instruction for printing character data according to character command data specifying the output of the character data; obtaining the character command data; selecting a format of the character data to be used for generating the output of the character data based on the character command data; and requesting the character data having the selected format.

In addition to the above-described example embodiments, the present invention may be practiced in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
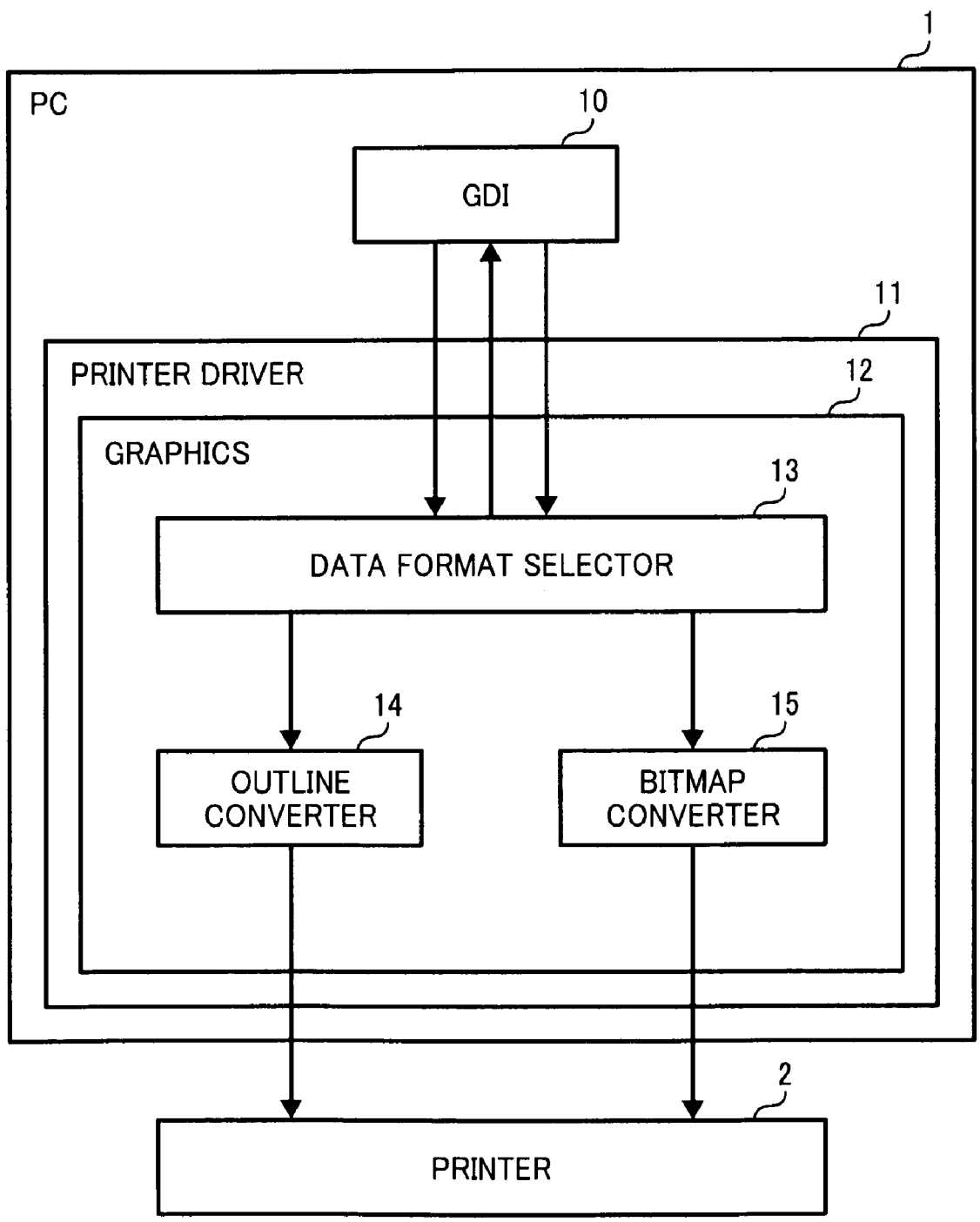
FIG. 1 is a schematic block diagram illustrating a functional structure of a print data generating apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring to FIG. 1, in one example operation, an image forming system may be provided, which includes a print data generating apparatus 1, and a printer 2, which are connected, for example, through a communication line such as a universal serial bus (USB) or a network such as a local are network (LAN). The print data generating apparatus 1 may be implemented by a personal computer (PC) such as a desktop computer, notebook computer, personal device assistant (PDA), etc. The printer 2 may be implemented by any desired printer such as a laser printer or an inkjet printer, a multifunctional apparatus (MFP) having a plurality of image forming functions including faxing, printing, copying, etc. For the illustrative purpose, the print data generating apparatus 1 is referred to as the PC 1.

Figure 9:
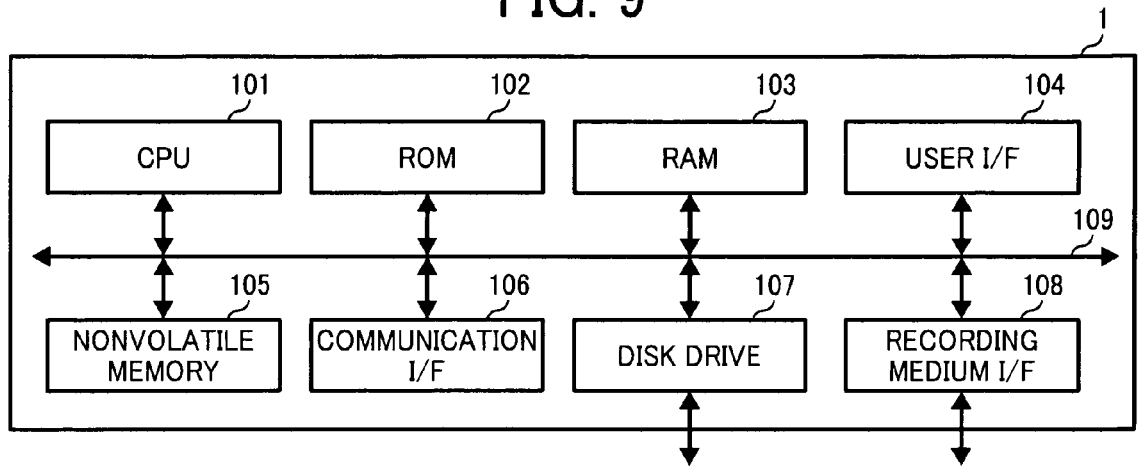
FIG. 9 is a schematic block diagram illustrating a hardware structure of the print data generating apparatus shown in FIG. 1 or FIG. 6, according to an example embodiment of the present invention.

Referring to FIG. 9, an example hardware structure of the PC 1 is explained. The PC 1 includes a microprocessor such as a central processing unit (CPU) 101, a read only memory (ROM) 102, a random access memory (RAM) 103, a user interface (I/F) 104, and a nonvolatile memory 105, a communication interface (I/F) 106, a disk drive 107, and a recording medium interface (I/F) 108, which are connected through a system bus 109.

The disk drive 107 may be connected to any desired disk device including, for example, a hard disk device (HDD) or a flexible disk. The disk drive 107 writes data to or read data from the disk device under control of the CPU 101.

The recording medium I/F 108 may be connected to a removable recording medium including, for example, a universal serial bus (USB) memory, secure digital (SD) card memory, flash memory, compact disc (CD), compact disc rewritable (CD-RW), digital video disc (DVD), or flexible disk. The recording medium I/F 108 writes data to or read data from the recording medium under control of the CPU 101.

The communication I/F 106 allows the CPU 101 to communicate with other apparatuses such as the printer 2 via the network.

The nonvolatile memory 105 stores various data under control of the CPU 101 in a nonvolatile form such that the data is not automatically deleted after the power of the PC 1 is turned off.

The user I/F 104 allows the user to interact with the PC 1. The user I/F may include an input device such as a mouse or a keyboard, and an output device such as a liquid crystal display (LCD) or a speaker.

The RAM 103 may function as a work area of the CPU 101. The ROM 102 may store various data including, for example, various programs to be run by the CPU 101 or system data.

Figure 10:
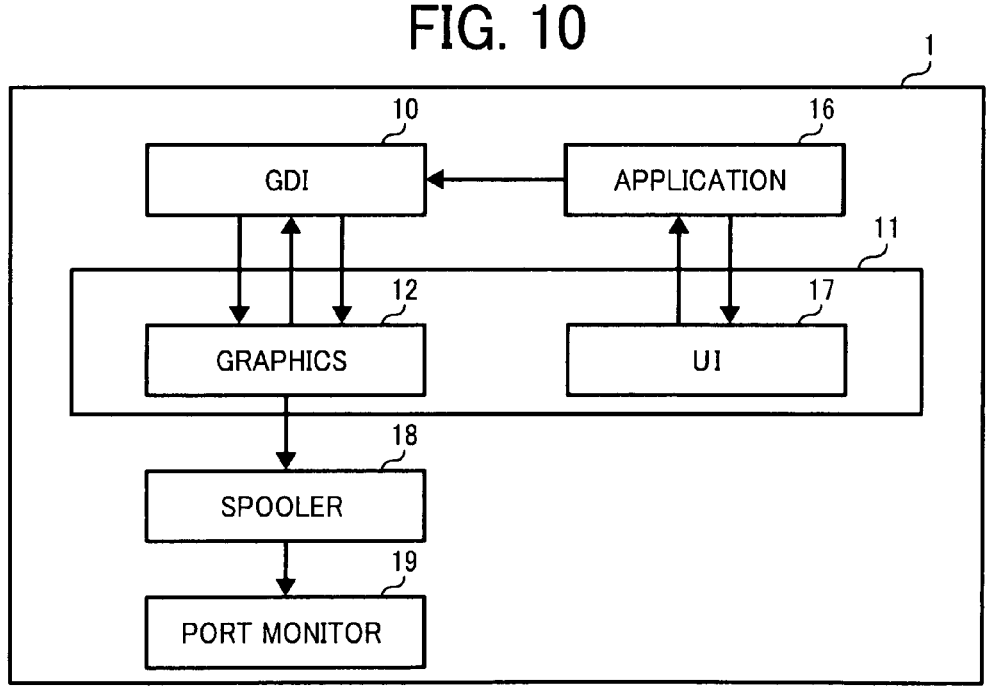
FIG. 10 is a schematic block diagram illustrating a functional structure of the print data generating apparatus shown in FIG. 1, according to an example embodiment of the present invention.

The CPU 101 controls operation or function of the PC 1, for example, by executing a program being loaded in the RAM 103. The program may be stored in any one of the ROM 102, the nonvolatile memory 105, the disk device connectable to the disk drive 107, the recording medium connectable to the recording medium I/F 108, or any other device accessible from the CPU 101 via the network. The program being stored may include an operating system (OS) such as the Windows, an application 16 (FIG. 10), and a printer driver 11 (FIG. 10). Specifically, in this example, a print data generating program may be provided, which causes the PC 1 to have a printer driver 11 (FIG. 10) which generates print data, for example, as described below referring to any one of FIGS. 2 to 8. The print data generating program may be written in any desired language including, for example, the legacy programming language such as assembler, C, C++, C#, Java, or the project-oriented programming language. As described above, the print data generating program may be stored in any desired memory or storage device, and read by the PC 1 through an input/output interface such as the communication I/F 106, the disk drive 107, or the recording medium I/F 108.

Referring now to FIG. 10, a functional structure of a selected portion of the PC 1 is explained according to an example embodiment of the present invention. The selected portion of FIG. 10 relates to the function of generating print data, which may be performed according to the print data generating program.

Referring to FIG. 10, the PC 1 includes the application 16, a geographical device interface (GDI) 10, the printer driver 11, a spooler 18, and a port monitor 19.

The application 16 may include, for example, a document generating program providing the function of generating or editing document data, a drawing program providing the function of generating drawing data, a spreadsheet program, a database program, a browser, etc.

The GDI 10 is a component of the OS, which provides the function that the application 16 can use to generate graphical data for output by an output device such as the printer 2. For example, the GDI 10 may receive data to be printed from the application 16, and pass the data to be printed to the printer driver 11.

The printer driver 11 has a function of generating print data from the data received from the GDI 10. The printer driver 11 mainly includes a graphics section 12 and a user interface (UI) section 17.

The spooler 18 may be provided with a memory space, which stores the print data generated by the printer driver 11, before output to the printer 2. The print data may be output to the printer 2 through the port monitor 19.

In example operation, the PC 1 receives a user instruction for printing data including character data through the user I/F 104. The character data corresponds to any desired type or number of characters, numerical, or symbols being included in the data to be printed. Further, in this example, the data to be printed, which may be displayed through the user I/F 104, may be generated by the PC 1 using the application 16 or generated by any apparatus other than the PC 1.

When the user instruction for printing is received through the application 16, the OS sends a DEVMODE structure including print settings information of the printer 2 to the UI section 17 of the printer driver 13. The printer UI section 17 of the printer driver 11 causes the application 16 to display a print settings dialog on the user I/F 104. After receiving a user input regarding various print settings through the print settings dialog, the printer UI section 17 sends a DEVMODE structure including information regarding various print settings to the application 16. The application 16 sends the DEVMODE structure including information regarding various print settings to the GDI 10. At this time, the application 16 sends the data to be printed, which includes character data and character command data, to the GDI 10 through a GDI call.

In this example, the character command data is any kind of information that specifies the characteristics of the output of the character data such as the character size or the character style. The character command data may be generated by the application 16 by default or according to a user input through the user I/F 104. For example, the character command data may include font property information specifying font property such as family, style, slant, weight, size, aspect, width, scale, character width, or character height.

The GDI 10 converts the GDI call to a DDI call, and passes the DDI call to the graphics section 12 of the printer driver 11 together with the DEVMODE structure including information regarding various print settings. In this example, the GDI 10 sends the character data in a format selected by the graphics section 12 of the printer driver 11. More specifically, the GDI 10 sends at least the character command data to the graphics section 12. The graphics section 12 analyzes the character command data received from the GDI 10 to select a format of the character data based on the analysis, and requests the GDI 10 to send the character data in the selected format by sending a request specifying the selected format to the GDI 10. In response to the request, the GDI 10 sends the character data having the selected format to the graphics section 12. In addition to the character data, the GDI 10 sends other kinds of data including, for example, the character command data specifying the output of the character data, and the control data specifying the various print settings of the print data.

Once the character data having the selected format is received, the graphics section 12 converts the character data having the selected format to converted character data having the selected format according to the character command data. The graphics section 12 further generates print data including the converted character data and the control data, and stores the print data in the spooler 18 for output to the printer 2 through the port monitor 19.

Referring now to FIG. 1, a functional structure of the graphics section 12 of the printer driver 11 is explained according to an example embodiment of the present invention. The graphics section 12 includes a data format selector 13, an outline converter 14, and a bitmap converter 15.

The data format selector 13 provides a function of obtaining character command data from an outside device provided outside of the printer driver 11 such as from the GDI 10, a function of selecting a format of character data based on the character command data, and a function of requesting the outside device for the character data having the selected format. In this example, it is assumed that the data format selector 13 selects one of an outline format and a bitmap format as the selected format, and requests the GDI 10 to send one of outline font data and bitmap font data based on the selected format.

The outline converter 14 converts the outline font data received from the GDI 10 according to the character command data to generate converted outline font data. The converted outline font data is used to generate print data.

The bitmap converter 15 converts the bitmap font data received from the GDI 10 according to the character command data to generate converted bitmap font data. The converted bitmap font data is used to generate print data.

Figure 2:
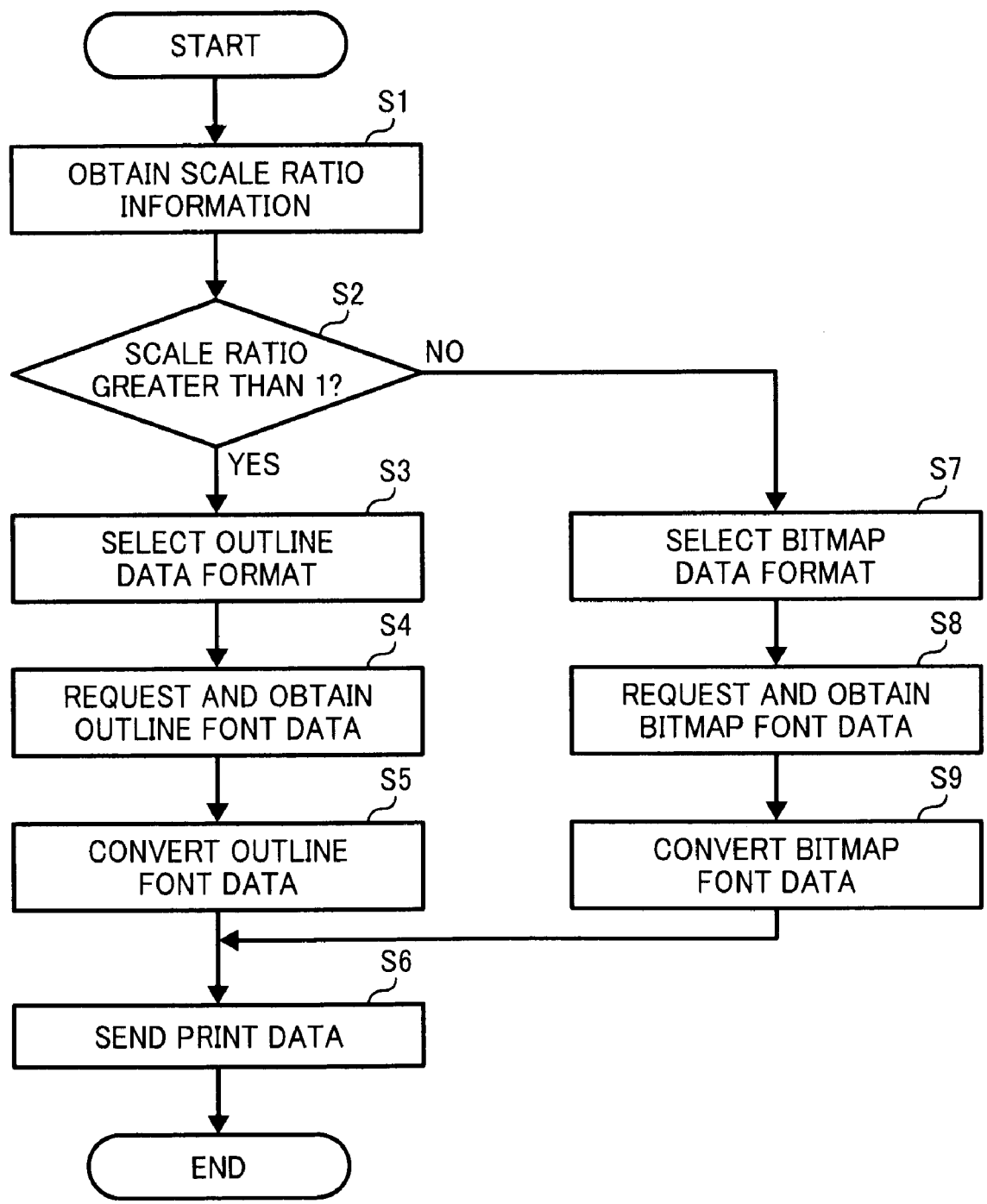
FIG. 2 is a flowchart illustrating operation of selecting a format of character data, performed by the print data generating apparatus of FIG. 1, according to an example embodiment of the present invention.

Referring now to FIG. 2, operation of selecting a format of character data, performed by the graphics section 12, is explained according to an example embodiment of the present invention. In this example, it is assumed that the character command data to be used by the data format selector 13 includes information regarding the scale ratio ("scale ratio information"), which specifies the scaling factor to be applied to the character data having the default character size such that the character image being output is caused to have a desired character size. For example, the scale ratio information may be expressed in terms of a numerical value. Alternatively, the scale ratio information may be expressed in terms of keywords that are each previously set to indicate the specific scaling factor value. The processing performed as describe below referring to FIG. 2 is referred to as the scale-based processing.

At S1, the data format selector 13 obtains scale ratio information from the GDI 10.

At S2, the data format selector 13 determines whether the scale ratio specified by the scale ratio information obtained at S1 is greater than 1.0. When it is determined that the scale ratio is greater than 1.0 ("YES" at S2), the operation proceeds to S3. When it is determined that the scale ratio is equal to or less than 1.0 ("NO" at S2), the operation proceeds to S7.

At S3, the data format selector 13 selects an outline format as a format to be used for character data.

Figure 11A:
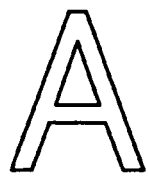
FIG. 11A is an illustration for explaining outline font data, according to an example embodiment of the present invention.

At S4, the data format selector 13 requests the GDI 10 to send the character data in the form of outline font data such as the outline font data illustrated in FIG. 11A, and obtains the outline font data from the GDI 10. The outline font data is sent to the outline converter 14 together with the scale ratio information.

At S5, the outline converter 14 converts the outline font data according to the scale ratio specified by the scale ratio information to generate converted outline font data. The converted outline font data is stored in the spooler 18 at least temporarily in the form of print data.

At S6, the spooler 18 sends the print data including the converted outline font data to the printer 2 through the port monitor 19, and the operation ends.

When it is determined that the scale ratio is equal to or less than 1.0 at S2, at S7, the data format selector 13 selects a bitmap data format as a format to be used for character data.

Figure 11B:
FIG. 11B is an illustration for explaining bitmap font data, according to an example embodiment of the present invention.

At S8, the data format selector 13 requests the GDI 10 to send the character data in the form of bitmap font data such as the bitmap font data illustrated in FIG. 11B, and obtains the bitmap font data from the GDI 10. The bitmap font data is sent to the bitmap converter 15 together with the scale ratio information.

At S9, the bitmap converter 15 converts the bitmap font data according to the scale ratio specified by the scale ratio information to generate converted bitmap font data. The converted bitmap font data is stored in the spooler 18 at least temporarily in the form of print data. The operation further proceeds to S6 to send the print data including the converted bitmap font data to the printer 2 through the port monitor 19, and the operation ends.

As described above referring to FIG. 2, the printer driver 11 selects a format to be used for character data based on character command data specifying the output of the character data, and requests the GDI 10 to send the character data in the selected format. For example, when the scale ratio information indicates that the character is to be output at the size larger than the default size, the outline font data is selected as the outline font data reproduces the high quality character image even when the font size is enlarged. In another example, when the scale ratio information indicates that the character is to be output at the size smaller than the default size, the bitmap font data is selected as the bitmap font data reproduces the high quality character image even when the font size is reduced. Alternatively, in this example, when the scale ratio information indicates that no scaling is to be applied, i.e., the scale ratio equals to 1.0, any one of the outline format and the bitmap format may be selected.

Since the print driver 11 selects a format to be used for character data, that is mostly likely to produce the high image quality output under the printing condition determined by the character command data, and provides the character data in the selected format, further processing is not required. For example, a font rasterizer does not have to be provided in either one of the PC 1 and the printer 2, thus reducing the overall cost of the image forming system. Further, post processing to improve the image quality does not have to be performed such that the work load of the PC 1 as well as the overall processing time may be reduced. Further, requiring no post processing may suppress the negative influence, which may be otherwise caused due to post processing such as the document layout problem.

The operation of FIG. 2 may be performed in various other ways. For example, a threshold value of 1.0, which is used to determine a format of character data at S2, is not limited to 1.0. The threshold value may be set according to the user preference, for example, through a setting file viewable by the user through the user I/F 104.

In another example, a type of information to be used for determining a format of character data is not limited to the scale ratio information as described above referring to FIG. 2, for example, as described below referring to FIG. 3 or 4.

Figure 3:
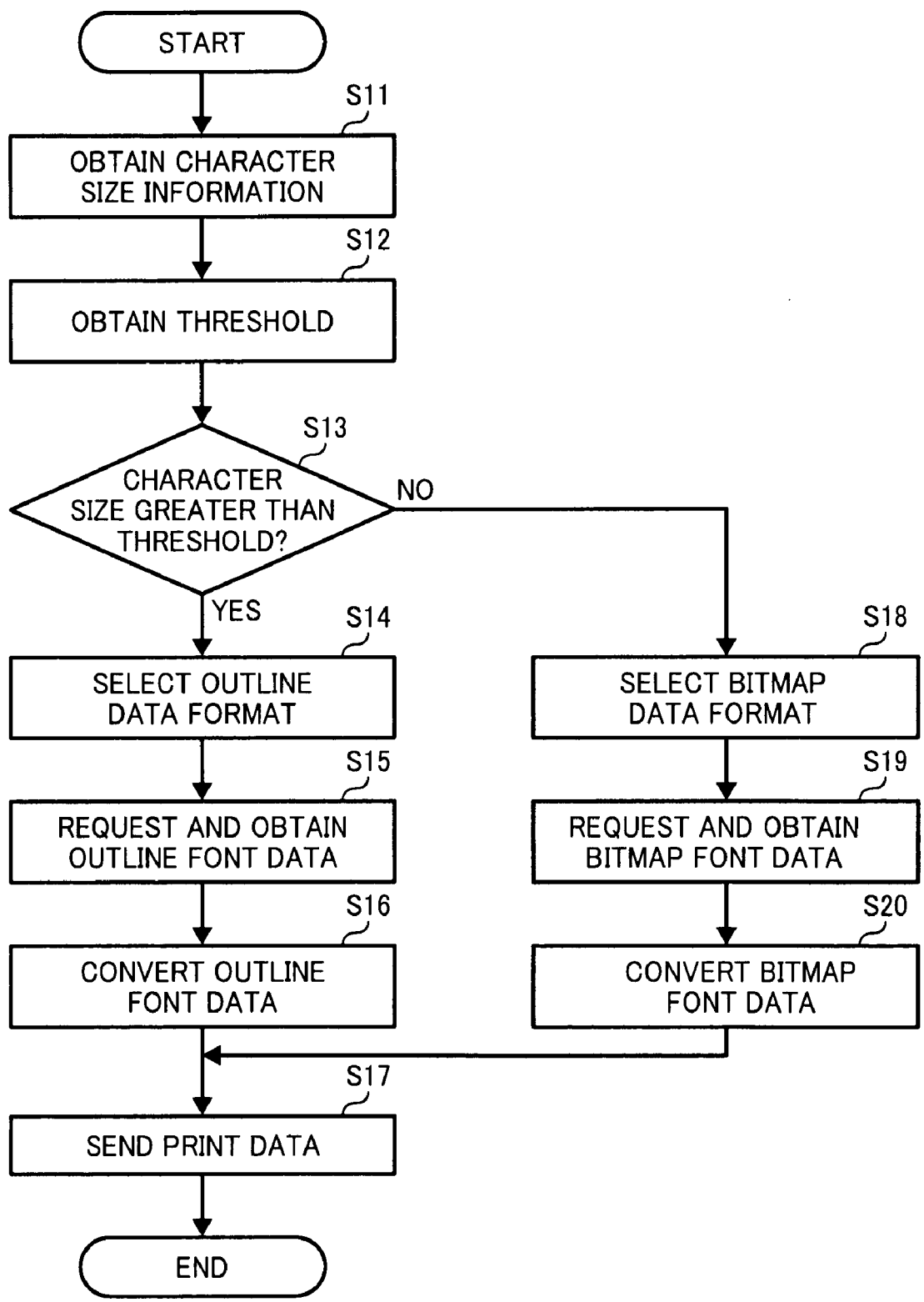
FIG. 3 is a flowchart illustrating operation of selecting a format of character data, performed by the print data generating apparatus of FIG. 1, according to an example embodiment of the present invention.

Referring now to FIG. 3, operation of selecting a format of character data, performed by the graphics section 12, is explained according to an example embodiment of the present invention. In this example, it is assumed that the character command data to be used by the data format selector 13 includes information regarding the character size ("character size information"), which specifies the size of the character such as the width of the character or the height of the character. For example, the character size information may be expressed in terms of a numerical value indicating the width or the height of the character in the unit of points, picas, inches, centimeters, etc. Alternatively, the character size information may be expressed in terms of percentage. The processing performed as describe below referring to FIG. 3 is referred to as the threshold-based processing.

At S11, the data format selector 13 obtains character size information from the GDI 10.

At S12, the data format selector 13 obtains a threshold value. For example, the threshold value may be stored in any desired memory provided in the PC 1, for example, in a registry of the OS or a setting file. The threshold value may be previously set by default or according to the user preference. In one example, for a selected number of font types, the user may print the character data in various font sizes using outline font data and using bitmap font data, and analyze the visual quality of the character to determine a threshold value.

At S13, the data format selector 13 determines whether the character size specified by the character size information obtained at S11 is greater than the threshold value obtained at S12. When it is determined that the character size is greater than the threshold value ("YES" at S13), the operation proceeds to S14. When it is determined that the character size is equal to or smaller than the threshold value ("NO" at S13), the operation proceeds to S18.

At S14, the data format selector 13 selects an outline format as a format to be used for character data.

At S15, the data format selector 13 requests the GDI 10 to send the character data in the form of outline font data such as the outline font data illustrated in FIG. 11A, and obtains the outline font data from the GDI 10. The outline font data is sent to the outline converter 14 together with the scale ratio information.

At S16, the outline converter 14 converts the outline font data such that the resultant outline font data has the character size specified by the character size information. The converted outline font data is stored in the spooler 18 at least temporarily in the form of print data.

At S17, the spooler 18 sends the print data including the converted outline font data to the printer 2 through the port monitor 19, and the operation ends.

When it is determined that the character size is equal to or less than the threshold value at S13, at S18, the data format selector 13 selects a bitmap data format as a data format to be used for character data.

At S19, the data format selector 13 requests the GDI 10 to send the character data in the form of bitmap font data such as the bitmap font data illustrated in FIG. 11B, and obtains the bitmap font data from the GDI 10. The bitmap font data is sent to the bitmap converter 15 together with the character size information.

At S20, the bitmap converter 15 converts the bitmap font data such that the resultant bitmap font data has the character size specified by the character size information. The converted bitmap font data is stored in the spooler 18 at least temporarily in the form of print data. The operation further proceeds to S17 to send the print data including the converted bitmap font data to the printer 2 through the port monitor 19, and the operation ends.

As described above referring to FIG. 3, the printer driver 11 selects a format to be used for character data based on character command data specifying the output of the character data, and requests the GDI 10 to send the character data in the selected format. For example, when the character size information indicates that the character is to be output at the size larger than the threshold value, the outline font data is selected as the outline font data reproduces the high quality character image at large font sizes. In another example, when the character size information indicates that the character is to be output at the size smaller than the threshold value, the bitmap font data is selected as the bitmap font data reproduces the high quality character image at small font sizes. Alternatively, in this example, when the character size information indicates that the character size is equal to the threshold value, any one of the outline format and the bitmap format may be selected.

Figure 4:
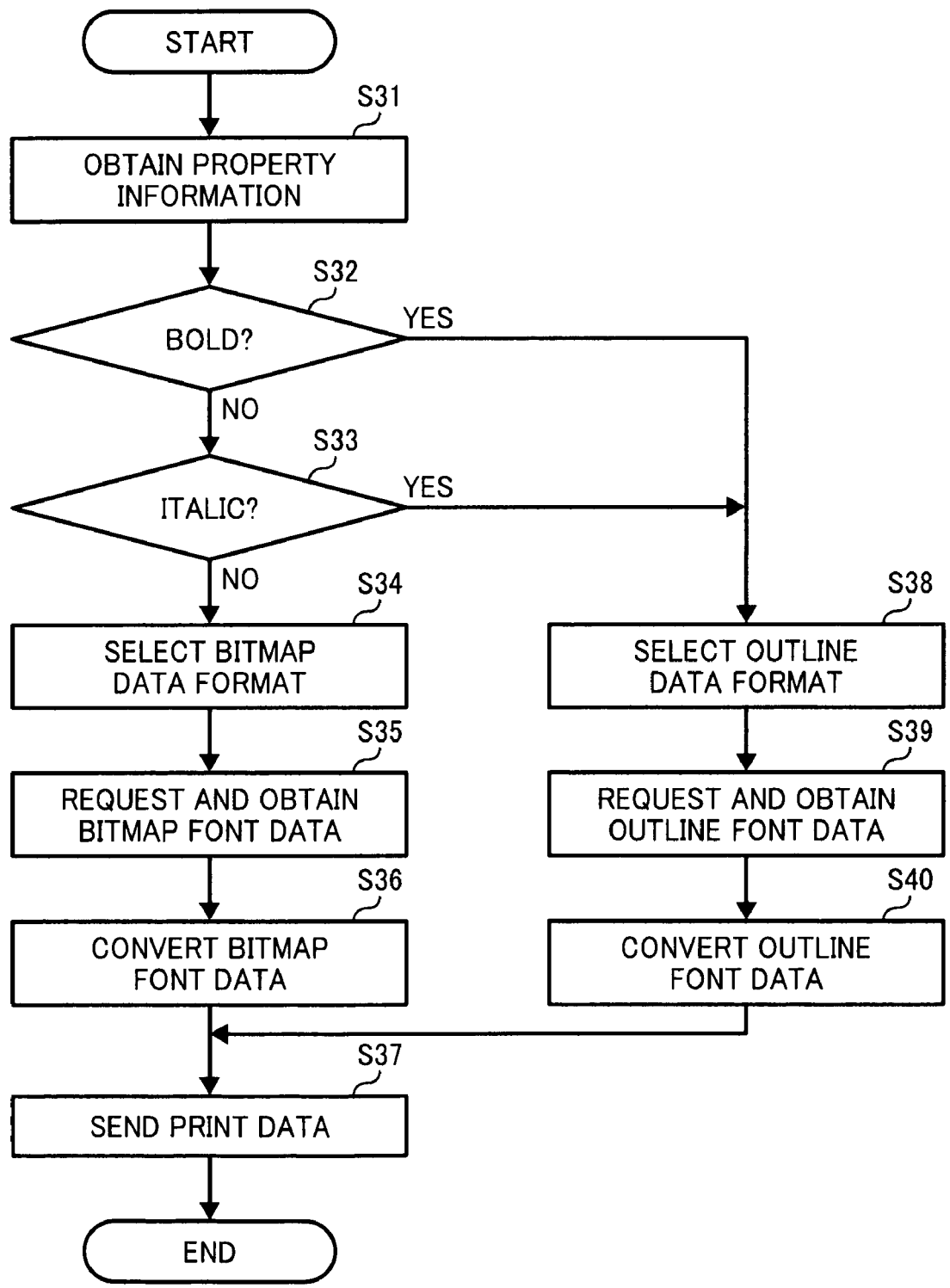
FIG. 4 is a flowchart illustrating operation of selecting format of character data, performed by the print data generating apparatus of FIG. 1, according to an example embodiment of the present invention.

Referring now to FIG. 4, operation of selecting a format of character data, performed by the graphics section 12, is explained according to an example embodiment of the present invention. In this example, it is assumed that the character command data to be used by the data format selector 13 includes information regarding the property of the character ("character property information"), which specifies the style of the character such as the slant property or the weight property of the character data. For the illustrative purpose, in this example, the character property information may include weight property information indicating whether the character is to be printed in bold, and slant property information indicating whether the character is to be printed in italic. The processing performed as describe below referring to FIG. 4 is referred to as the property-based processing.

At S31, the data format selector 13 obtains character property information from the GDI 10.

For example, the data format selector 13 obtains weight property information indicating whether the character is to be printed in bold, which may be expressed in a parameter value specifying the thickness of the character line. For example, the weight property information having a parameter value that is larger than the parameter value corresponding to the medium or regular line thickness may be referred to as the weight property information indicating the bold.

Further, the data format selector 13 obtains slant property information indicating whether the character is to be printed in italic, which may be expressed in a parameter value specifying the slant of the character. For example, the slant property information having a parameter value that corresponds to the italic or oblique may be referred to as the slant property information indicating the italic.

At S32, the data format selector 13 determines whether the character property specified by the character property information obtained at S32 indicates that the character is to be printed in bold. When it is determined that the character property is not bold ("NO" at S32), the operation proceeds to S33. When it is determined that the character property is bold ("YES" at S32), the operation proceeds to S38.

At S33, the data format selector 13 further determines whether the character property specified by the character property information obtained at S32 indicates that the character is to be printed in italic. When it is determined that the character property is not italic ("NO" at S33), the operation proceeds to S34. When it is determined that the character property is italic ("YES" at S33), the operation proceeds to S38.

At S34, the data format selector 13 selects a bitmap format as a format to be used for character data.

At S35, the data format selector 13 requests the GDI 10 to send the character data in the form of bitmap font data such as the bitmap font data illustrated in FIG. 11B, and obtains the bitmap font data from the GDI 10. The bitmap font data is sent to the bitmap converter 15 together with the character property information.

At S36, the bitmap converter 15 converts the bitmap font data such that the resultant bitmap font data has the character property specified by the character property information. The converted bitmap font data is stored in the spooler 18 at least temporarily in the form of print data.

At S37, the spooler 18 sends the print data including the converted bitmap font data to the printer 2 through the port monitor 19, and the operation ends.

When it is determined that the character property is bold at S32 or italic at S33, at S38, the data format selector 13 selects an outline data format as a format to be used for character data.

At S39, the data format selector 13 requests the GDI 10 to send the character data in the form of outline font data such as the outline font data illustrated in FIG. 11A, and obtains the outline font data from the GDI 10. The outline font data is sent to the outline converter 14 together with the character property information.

At S40, the outline converter 14 converts the outline font data such that the resultant outline font data has the character property specified by the character property information. The converted outline font data is stored in the spooler 18 at least temporarily in the form of print data. The operation further proceeds to S37 to send the print data including the converted outline font data to the printer 2 through the port monitor 19, and the operation ends.

As described above referring to FIG. 4, the printer driver 11 selects a format to be used for character data based on character command data specifying the output of the character data, and requests the GDI 10 to send the character data in the selected format. For example, when the character property information indicates that the character is to be output in bold or italic, the outline font data is selected as the outline font data reproduces the high quality character image when the character line is thick or when the character is to be output in slant. In another example, when the character property information indicates that the character to be output is neither in bold or italic, the bitmap font data is selected as the bitmap font data reproduces the high quality character image when the character line is normal or thin or when the character is to be output in upright position.

As described above referring to any one of FIGS. 2, 3, and 4, the type of processing to be applied by the graphics section 12 of the printer driver 11 is previously set, for example, according to the print data generating program. Alternatively, the print data generating program may cause the graphics section 12 of the printer driver 11 to select the type of processing, for example, according to the user preference.

In one example, processing type information specifying the type of processing to be used by the graphics section 12 may be stored in any desired memory of the PC 1 such as in the form of registry of the OS or a setting file. The processing type information may be set by the user through the user I/F 104. For example, when the processing type information specifies that the scale-based processing to be used, the graphics section 12 performs operation of FIG. 2, which uses the scale ratio information to determine a format of character data. In another example, when the processing type information specifies that the threshold-based processing to be used, the graphics section 12 performs operation of FIG. 3, which uses the character size information to determine a format of character data. In another example, when the processing type information specifies that the property-based processing to be used, the graphics section 12 performs operation of FIG. 4, which uses the character property information to determine a format of character data.

Figure 5:
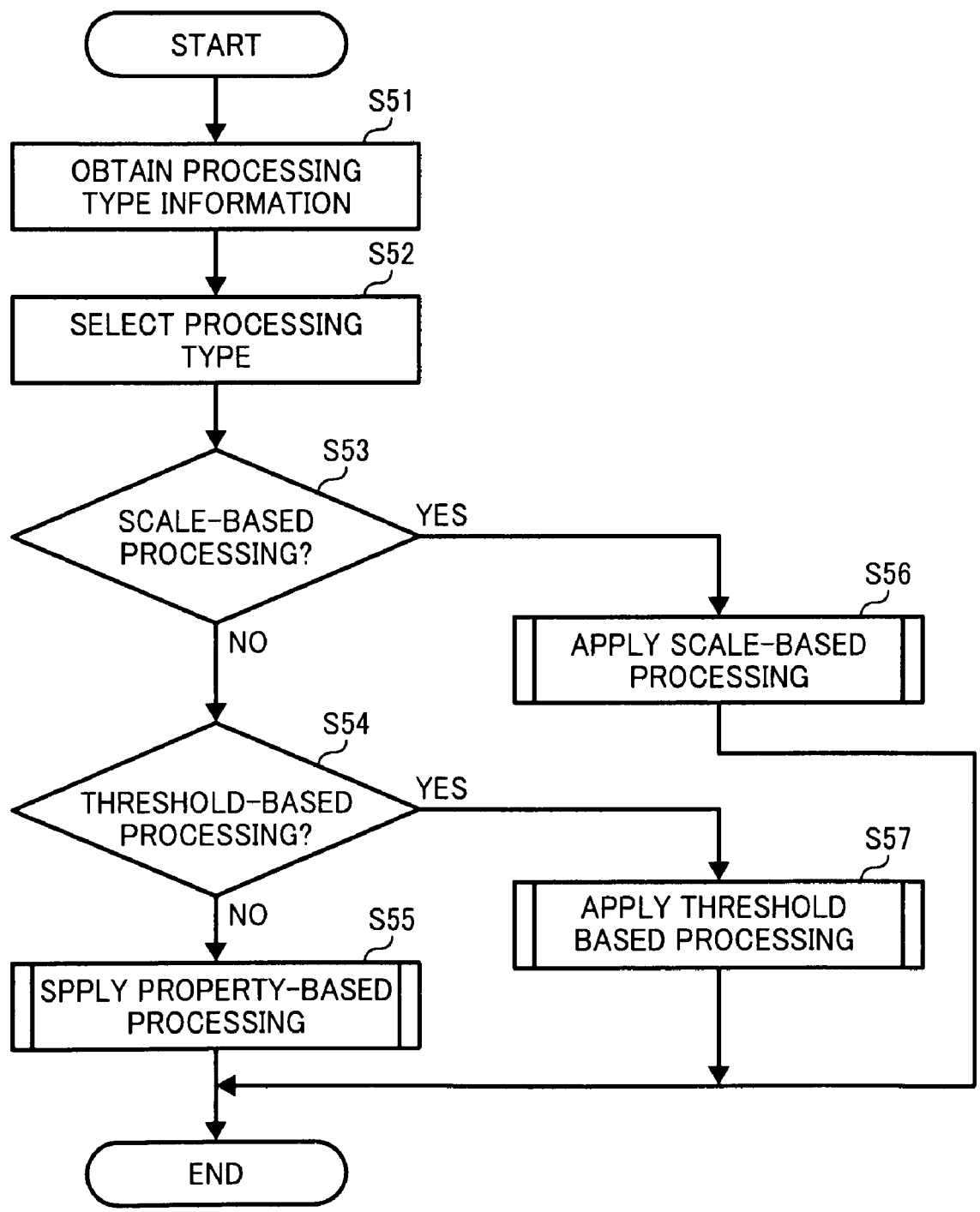
FIG. 5 is a flowchart illustrating operation of selecting a processing type, performed by the print data generating apparatus of FIG. 1, according to an example embodiment of the present invention.

Referring now to FIG. 5, operation of selecting the processing type, performed by the data format selector 13 of the graphics section 12, is explained according to an example embodiment of the present invention.

At S51, the data format selector 13 obtains processing type information regarding the type of processing to be used by the graphics section 12. In this example, it is assumed that the processing type information specifies one of the scale-based processing described above referring to FIG. 2, the threshold-based processing described above referring to FIG. 3, and the property-based processing described above referring to FIG. 4.

At S52, the data format selector 13 selects the processing type to be used according to the processing type information obtained at S51.

At S53, the data format selector 13 determines whether the processing type selected at S52 is scale-based processing. When it is determined that the selected processing type is scale-based processing ("YES" at S53), the operation proceeds to S56 to apply scale-based processing, and perform operation of FIG. 2. When it is determined that the selected processing type is not scale-based processing ("NO" at S53), the operation proceeds to S54.

At S54, the data format selector 13 determines whether the processing type selected at S52 is threshold-based processing. When it is determined that the selected processing type is threshold-based processing ("YES" at S54), the operation proceeds to S57 to apply threshold-based processing, and perform operation of FIG. 3. When it is determined that the selected processing type is not threshold-based processing ("NO" at S54), it is assumed that the selected processing type is property-based processing and the operation proceeds to S55 to apply property-based processing, and perform operation of FIG. 4.

As described above referring to FIG. 5, the processing type to be used by the graphics section 12 may be changed according to the user preference, for example, through the setting file, thus increasing operability for the user.

As described above referring to any one of FIGS. 1 to 4, the printer driver 11 obtains character data in a selected format, and generates print data including the character data being converted according to character command data for output to the printer 2. Alternatively, a printer driver may be provided, which is capable of generating intermediate data using the character data and the character command data, and store the intermediate data for later use. Storing the intermediate data allows the user to change the output of the character data, for example, by changing the character command data.

Figure 6:
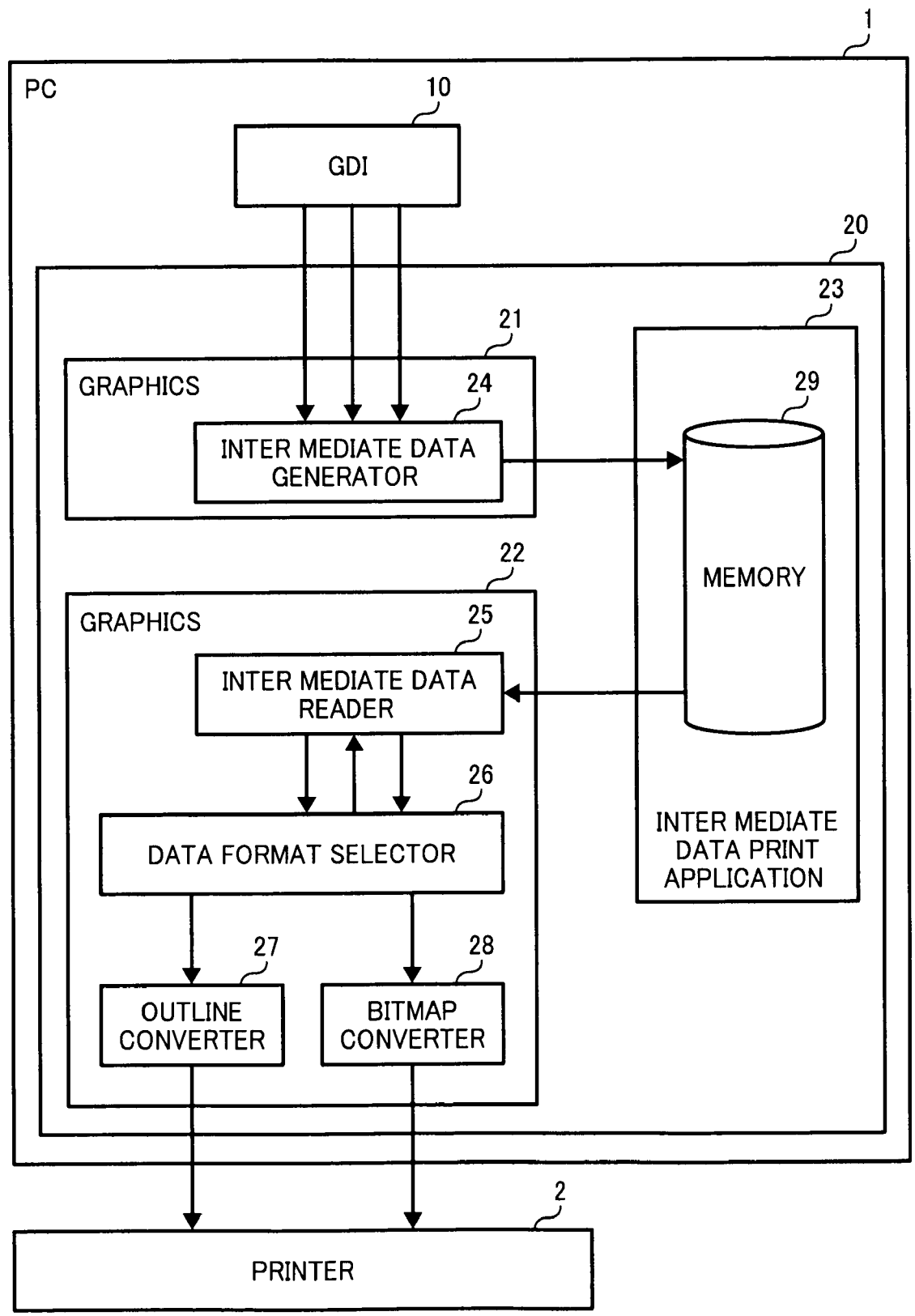
FIG. 6 is a schematic block diagram illustrating a functional structure of a print data generating apparatus, according to an example embodiment of the present invention.

Referring now to FIG. 6, a functional structure of a selected portion of the PC 1 is explained according to an example embodiment of the present invention. The functional structure of the PC 1 shown in FIG. 6 is substantially similar to the functional structure of the PC 1 shown in FIG. 1, except for a functional structure of a printer driver, which may be referred to as a printer driver 20. In addition to the devices illustrated in FIG. 6, the PC 1 may include the application 16, the spooler 18, and the port monitor 19, as illustrated in FIG. 10.

The printer driver 20 includes a pre-processing graphics section 21, a post-processing graphics section 22, and an intermediate data print application 23. In addition to the sections 21, 22, and 23 illustrated in FIG. 6, the printer driver 20 may additionally include the UI section 17 as described above referring to FIG. 10.

The pre-processing graphics section 21 includes an intermediate data generator 24, which has a function of generating intermediate data using character data and character command data that are obtained from the GDI 10. The intermediate data being generated may be sent to the intermediate data print application 23.

The intermediate data print application 23 includes a memory 29, which has a function of storing the intermediate data being received from the pre-processing graphics section 21. Further, the intermediate data print application 23 may display the character image being generated based on the intermediate data through the UI section 17 for preview by the user. Further, the intermediate data print application 23 may allow the user to change the output of the character data, for example, by editing the character command data through the UI section 17. The memory 29 stores information that reflects a user input specifying the change to the character command data.

The post-processing graphics section 22 includes an intermediate data reader 25, a data format selector 26, an outline converter 27, and a bitmap converter 28. The intermediate data reader 25 provides a function of obtaining the intermediate data being stored in the memory 29. The data format selector 26 is substantially similar in function to the data format selector 13 of FIG. 1, except that the data format selector 26 communicates with the intermediate data reader 25. The outline converter 27 is substantially similar in function to the outline converter 14 of FIG. 1. The bitmap converter 28 is substantially similar in function to the bitmap converter 15 of FIG. 1.

In example operation, the PC 1 receives a user instruction for printing data including character data through the user I/F 104. When character data and character command data are received from the application 16, the GDI 10 passes the character data and the character command data to the intermediate data generator 24 of the pre-processing graphics section 21. In this example, the GDI 10 passes the character data in the form of outline font data and in the form of bitmap font data.

The intermediate data generator 24 generates intermediate data, which includes the outline font data, the bitmap font data, and the character command data, and sends the intermediate data to the intermediate data print application 23.

The intermediate data print application 23 stores the intermediate data received from the pre-processing graphics section 21 in the memory 29.

In one example, the intermediate data print application 23 allows the user to change the character command data according to a user input received through the UI section 17. For example, the UI section 17 may display a character settings dialog on the user I/F 104. When a user input specifying the change to the character command data is received by the UI section 17 for specific character data, the intermediate data print application 23 updates the character command data corresponding to the specific character data according to the user input. For example, it is assumed that the character command data includes the scale ratio information specifying that the character is to be output at the size twice of the default font size. When the user input is received, which indicates that the scale ratio information to be changed such that the character is to be output at the size half of the default font size, the intermediate data print application 23 identifies the intermediate data including the character command data for the specific character data, and changes the scale ratio information of the character command data to indicate that the character is to be output at the size half of the default font size.

In another example, the intermediate data print application 23 may generate a character image using the character data and the character command data obtained from the intermediate data stored in the memory 29, and display the character image through the user I/F 104 as a preview image. In this example, the UI section 17 may automatically display the character image upon activation of the character settings dialog. Alternatively, the UI section 17 may display the character image when a user instruction for displaying the character image is received. With this preview function, the user is capable of visually checking the output of the character image, which may be changed according to the character command data that can be changed by a user input. For example, the UI section 17 may display the character image being generated using the character command data before the user inputs a user input, and the character image being generated using the character command data after the user inputs a user input. By comparing two images, the user may easily determine which character command data is to be used for improved image quality.

When a user instruction for printing the character data is received through the user I/F 140, the UI section 17 causes the post-processing graphics section 22 to obtain the intermediate data that corresponds to the character data specified by the user instruction. Specifically, in this example, the intermediate data reader 25 reads out the intermediate data from the memory 29. In this example, when no user input specifying the change to the character command data is received, the intermediate data being read corresponds to the intermediate data originally sent from the intermediate data generator 24 of the pre-processing graphics section 21. In another example, when a user input specifying the change to the command data is input, the intermediate data being read corresponds to the intermediate data being updated according to the user input.

When the user instruction for printing the character data is received, the data format selector 26 obtains the character command data from the intermediate data reader 25, analyzes the character command data to select a format of the character data based on the analysis, and requests the intermediate data reader 25 to send the character data in the selected format by sending a request specifying the selected format to the intermediate data reader 25. In response to the request, the intermediate data reader 25 sends the character data having the selected format to the data format selector 26. In addition to the character data, the intermediate data reader 25 sends other kinds of data including, for example, the character command data specifying the output of the character data, and the control data specifying the various print settings of the print data.

Once the format of the character data is determined, the post-processing graphics section 22 converts the character data having the selected format to converted character data having the selected format according to the character command data. The post-processing graphics section 22 further generates print data including the converted character data and the control data, and stores the print data in the spooler 18 for output to the printer 2 through the port monitor 19.

Figure 7:
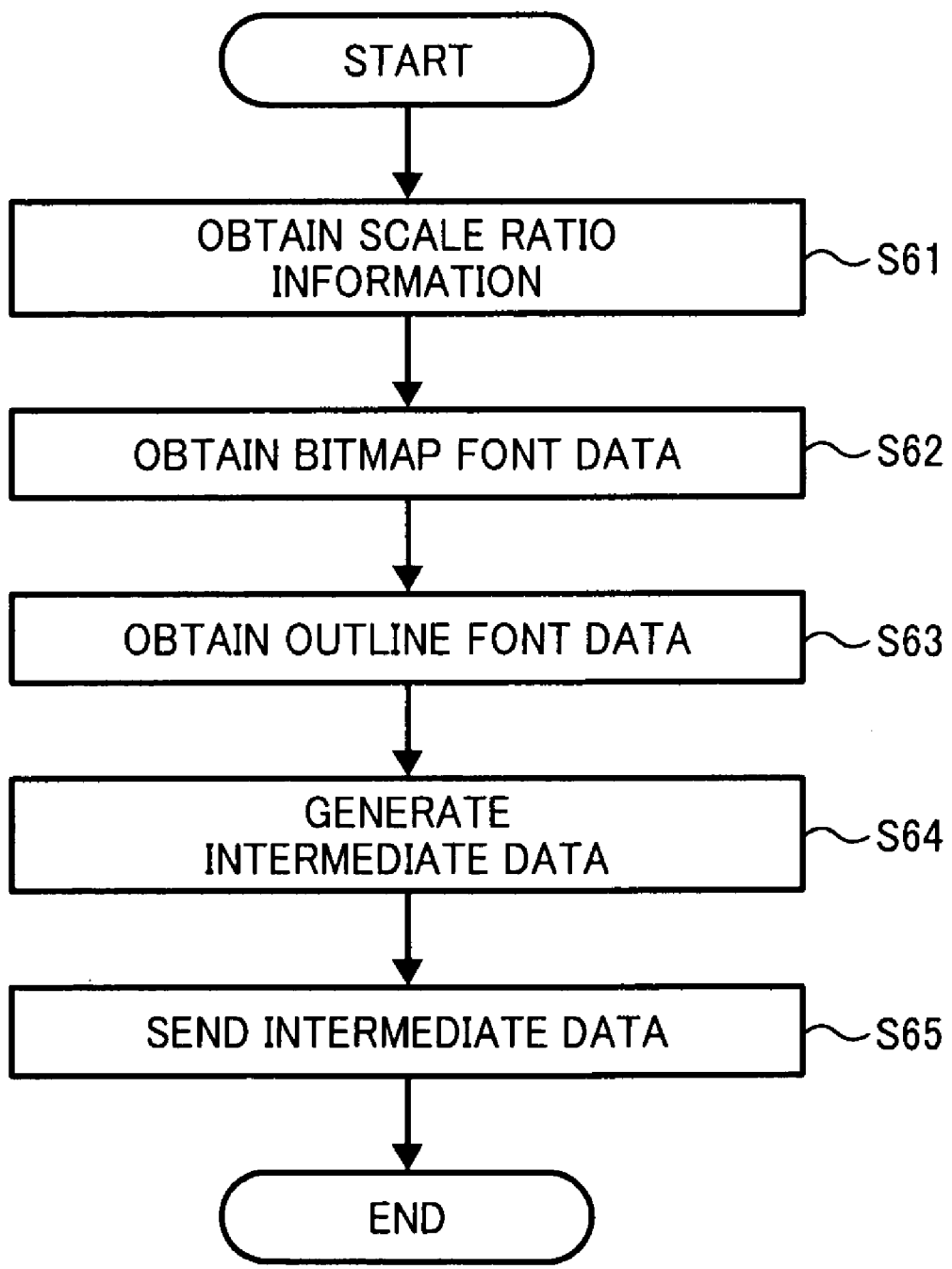
FIG. 7 is a flowchart illustrating operation of generating intermediate data including character data, performed by the print data generating apparatus of FIG. 6, according to an example embodiment of the present invention.

Referring now to FIG. 7, operation of generating intermediate data, performed by the pre-processing graphics section 21, is explained according to an example embodiment of the present invention. In this example, it is assumed that the character command data includes scale ratio information.

At S61, the intermediate data generator 24 obtains scale ratio information from the GDI 10. In addition to the scale ratio information, the intermediate data generator 24 may obtain other kinds of character command data as well as information regarding various print settings.

At S62, the intermediate data generator 62 obtains character data in the form of bitmap font data such as the bitmap font data illustrated in FIG. 11B from the GDI 10.

At S63, the intermediate data generator 62 obtains character data in the form of outline font data such as the outline font data illustrated in FIG. 11A from the GDI 10.

At S64, the intermediate data generator 62 generates intermediate data, which includes the outline font data, bitmap font data, and character command data.

At S65, the intermediate data generator 24 sends the intermediate data to the intermediate data print application 23, and the operation ends.

The above-described operation may be performed in various other ways. For example, at S61, information other than the scale ratio information may be obtained including, for example, character size information or character property information.

Figure 8:
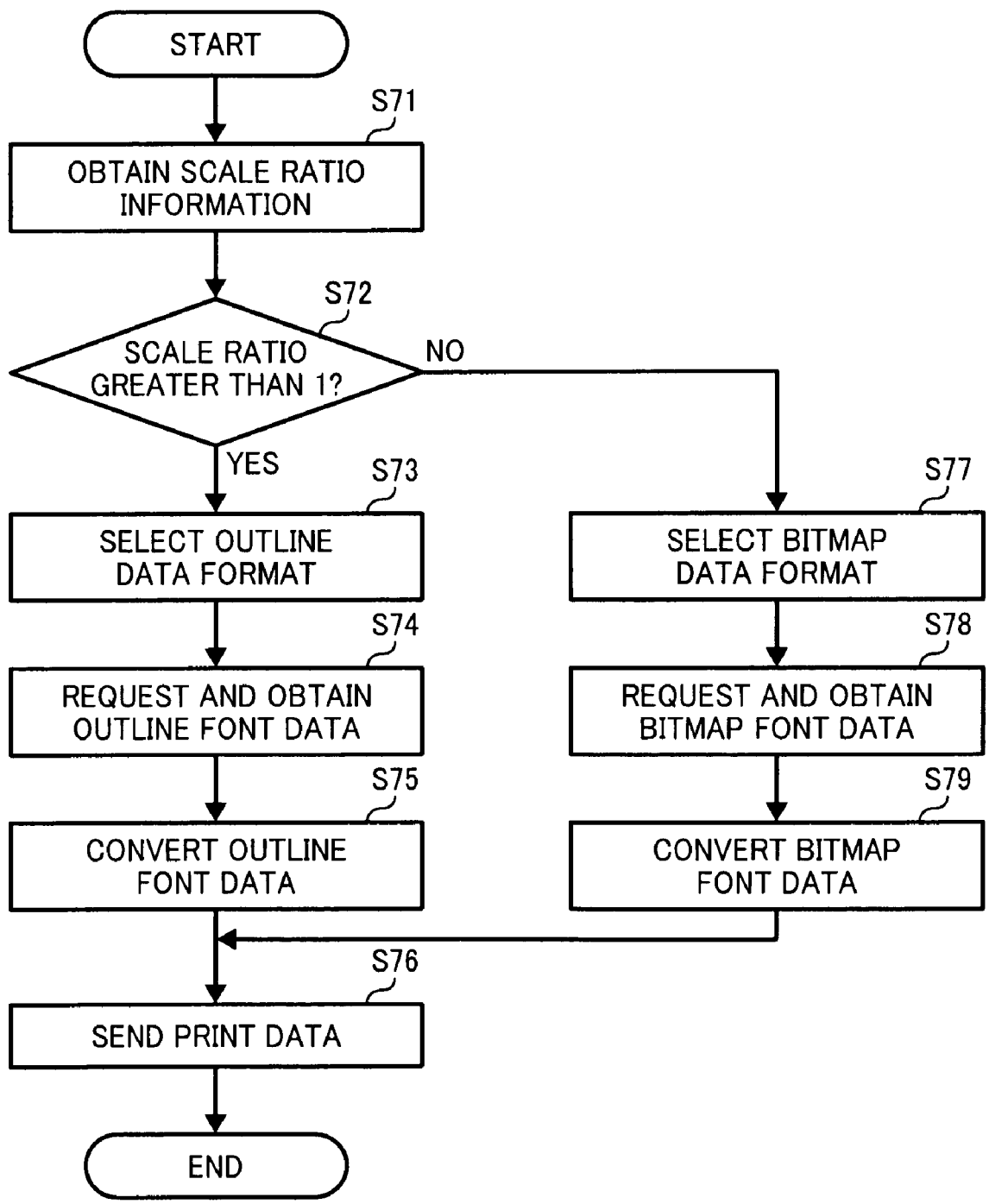
FIG. 8 is a flowchart illustrating operation of selecting a format of character data, performed by the print data generating apparatus of FIG. 6, according to an example embodiment of the present invention.

Referring now to FIG. 8, operation of selecting a format of character data, performed by the post-processing graphics 22, is explained according to an example embodiment of the present invention.

At S71, the intermediate data reader 25 reads the intermediate data from the memory 29 of the intermediate data print application 23, and sends the intermediate data to the data format selector 26.

At S72, the data format selector 26 determines whether the scale ratio specified by the scale ratio information obtained from the intermediate data reader 25 is greater than 1.00. When it is determined that the scale ratio is greater than 1.0 ("YES" at S72), the operation proceeds to S73. When it is determined that the scale ratio specified by the scale ration information is equal to or less than 1.0, the operation proceeds to S77.

At S73, the data format selector 26 selects an outline format as a format to be used for character data.

At S74, the data format selector 26 requests the intermediate data reader 25 to send the character data in the form of outline font data such as the outline font data illustrated in FIG. 11A, and obtains the outline font data from the intermediate data reader 25. The outline font data is sent to the outline converter 27 together with the scale ratio information.

At S75, the outline converter 27 converts the outline font data according to the scale ratio specified by the scale ratio information to generate converted outline font data. The converted outline font data is stored in the spooler 18 at least temporarily in the form of print data.

At S76, the spooler 18 sends the print data including the converted outline font data to the printer 2 through the port monitor 19, and the operation ends.

When it is determined that the scale ratio specified by the scale ratio information is equal to or less than 1.0 at S72, at S77, the data format selector 26 selects a bitmap data format as a format to be used for character data.

At S78, the data format selector 26 requests the intermediate data reader 25 to send the character data in the form of bitmap font data such as the bitmap font data illustrated in FIG. 11B, and obtains the bitmap font data from the intermediate data reader 25. The bitmap font data is sent to the bitmap converter 28 together with the scale ratio information.

At S79, the bitmap converter 28 converts the bitmap font data according to the scale ratio specified by the scale ratio information to generate converted bitmap font data. The converted bitmap font data is stored in the spooler 18 at least temporarily in the form of print data. The operation further proceeds to S76 to send the print data including the converted bitmap font data to the printer 2 through the port monitor 19, and the operation ends.

As described above referring to FIGS. 7 and 8, the printer driver 20 allows the user to change the output of character data by modifying character command data after the character command data is input. When a user input for modifying the character command data is received, the printer driver 20 selects a format to be used for the character data based on the modified character command data, and generates print data using the character data having the selected format. Even after storing the intermediate data in the memory 19, the printer driver 20 allows the user to modify the character command data being stored without requiring the intermediate data generator 24 to repeat operation of generating the intermediate data or without requiring the intermediate data print application 23 to repeat operation of obtaining the intermediate data.

The operation of FIG. 8 may be performed in various other ways. For example, information other than the scale ratio information may be used to determine a format of character data including, for example, character size information or character property information.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a character data processing apparatus, which includes: means for receiving a user instruction for printing character data according to character command data specifying the output of the character data; means for obtaining the character command data; means for selecting a format of the character data to be used for generating the output of the character data based on the character command data; and means for requesting the character data having the selected format.

In the above-described example, the character data processing apparatus may further include: means for obtaining the character data having the selected format; means for converting the character data having the selected format according to the character command data to generate converted character data having the selected format; and means for generating print data including the converted character data having the selected format.

In the above-described example, the character data processing apparatus may further include: means for generating intermediate data including the character data and the character command data; means for storing the intermediate data in a memory; and means for modifying the character command data of the intermediate data being stored in the memory to generate modified character command data according to a user input specifying the change to the character command data. The means for obtaining the character command data may include means for obtaining the modified character command data. The means for selecting a format of the character data to be used for generating the output of the character data based on the character command data may include means for selecting a format of the character data to be used for generating the output of the character data based on the modified character command data.

In the above-described example, the character command data includes at least one of: scale ratio information specifying the scaling factor to be applied to the character data; character size information specifying at least one of the width of the character in the converted character data and the height of the character in the converted character data; and character property information specifying the style of the character in the converted character data.

In the above-described example, the character data processing apparatus may further include: means for generating intermediate data including the character data and the character command data; means for storing the intermediate data in a memory; and means for modifying the character command data of the intermediate data being stored in the memory to generate modified character command data according to a user input specifying the change to the character command data. The means for obtaining the character command data may include means for obtaining the modified character command data. The means for selecting a format of the character data to be used for generating the output of the character data based on the character command data includes means for selecting a format of the character data to be used for generating the output of the character data based on the modified character command data.

In the above-described example, the character command data includes at least one of: scale ratio information specifying the scaling factor to be applied to the character data; character size information specifying at least one of the width of the character in the converted character data and the height of the character in the converted character data; and character property information specifying the style of the character in the converted character data.

In the above-described example, the character data processing apparatus includes: means for storing processing type information in a memory; and means for selecting one of the scale ratio information, the character size information, and the character property information of the character command data based on the processing type information. The means for selecting a format of the character data to be used for generating the output of the character data based on the character command data includes means for selecting a format of the character data to be used for generating the output of the character data based on the selected one of the scale ratio information, the character size information, and the character property information of the character command data.

In the above-described example, the means for converting includes: first converting means for converting the character data having a first format to the converted character data having the first format; second converting means for converting the character data having a second format to the converted character data having the second format; means for selecting one of the first converting means and the second converting means based on the selected format; and means for converting the character data having the selected format to the converted character data having the selected format according to the character command data using the selected one of the first converting means and the second converting means.

What is claimed is:

1. A method of processing character data to be printed by a printer, the method comprising:
receiving, through a user interface, a user instruction for printing character data according to character command data specifying the output of the character data;
selecting a type of processing to be performed based on processing type information stored in a memory;

extracting information from the character command data, the extracted information corresponding to the selected type of processing;

selecting a format of the character data to be used for generating the output of the character data by performing the selected type of processing using the extracted information of the character command data;

requesting the character data having the selected format;

storing processing type information in the memory, the processing type information specifying one of scale-based processing, threshold-based processing, and property-based processing; and selecting one of scale ratio information, character size information, and character property information of the character command data based on the selected type of processing that is specified by the processing type information, wherein when the scale-based processing is selected, the scale ratio information is extracted from the character command data to be used for selecting a format of the character data, when the threshold-based processing is selected, the character size information is extracted from the character command data to be used for selecting a format of the character data, and when the property-based processing is selected, the character property information is extracted from the character command data to be used for selecting a format of the character data.

2. The method of claim 1, further comprising:

obtaining the character data having the selected format;

converting the character data having the selected format according to the character command data to generate converted character data having the selected format; and generating print data including the converted character data having the selected format.

3. The method of claim 1, further comprising:

generating intermediate data including the character data and the character command data, the character data including at least two types of character data;

storing the intermediate data in a memory;

modifying the character command data of the intermediate data being stored in the memory to generate modified character command data according to a user input specifying the change to the character command data, selecting a format of the character data to be used for generating the output of the character data by performing the selected type of processing using information extracted from the modified character command data, the extracted information corresponding to the selected type of processing; and requesting one type of the character data having the selected format.

4. The method of claim 2, wherein the character command data comprises:

scale ratio information specifying the scaling factor to be applied to the character data;

character size information specifying at least one of the width of the character in the converted character data and the height of the character in the converted character data; and character property information specifying the style of the character in the converted character data.

5. The method of claim 2, wherein the converting comprises:

providing a first converter configured to covert the character data having a first format to the converted character data having the first format;

providing a second converter configured to convert the character data having a second format to the converted character data having the second format;

selecting one of the first converter and the second converter based on the selected format; and converting the character data having the selected format to the converted character data having the selected format according to the character command data using the selected converter.

6. A character data processing apparatus, comprising:

a processor;

a memory configured to store therein processing type information, the processing type information specifying one of scale-based processing, threshold-based processing, and property-based processing, an input/output interface configured to receive computer program instructions which when accessed by the processor cause the processor to operate as a specially programmed printer driver, the printer driver being configured to:

receive a user instruction for printing character data according to character command data specifying the output of the character data;

select a type of processing to be performed based on processing type information stored in a memory;

extract information from the character command data specifying the output of character data, the extracted information corresponding to the selected type of processing;

select a format of the character data to be used for generating the output of the character data by performing the selected type of processing using the extracted information of the character command data;

request the character data having the selected format; and select one of scale ratio information, character size information, and character property information of the character command data based on the selected type of processing that is specified by the processing type information such that, when the scale-based processing is selected, the scale ratio information is extracted from the character command data to be used for selecting a format of the character data, when the threshold-based processing is selected, the character size information is extracted from the character command data to be used for selecting a format of the character data, and when the property-based processing is selected, the character property information is extracted from the character command data to be used for selecting a format of the character data.

7. The apparatus of claim 6, wherein the printer driver is further configured to:

obtain the character data having the selected format;

convert the character data having the selected format according to the character command data to generate converted character data having the selected format; and generate print data including the converted character data having the selected format.

8. The apparatus of claim 6, wherein the printer driver is further configured to:
generate intermediate data including the character data and the character command data, the character data including at least two types of character data;
store the intermediate data in a memory;
modify the character command data of the intermediate data being stored in the memory to generate modified character command data according to a user input specifying the change to the character command data;
select a format of the character data to be used for generating the output of the character data by performing the selected type of processing using information extracted from the modified character command data, the extracted information corresponding to the selected type of processing; and
request one type of the character data having the selected format.

9. The apparatus of claim 7, wherein the character command data comprises:
scale ratio information specifying the scaling factor to be applied to the character data;
character size information specifying at least one of the width of the character in the converted character data and the height of the character in the converted character data; and
character property information specifying the style of the character in the converted character data.

10. The apparatus of claim 7, wherein the printer driver further comprises:
a first converter configured to convert the character data having a first format to the converted character data having the first format; and
a second converter configured to convert the character data having a second format to the converted character data having the second format, wherein
the printer driver is configured to select one of the first converter and the second converter based on the selected format and to cause the selected one of the first converter and the second converter to convert the character data having the selected format to the converted character data having the selected format according to the character command data.

11. A system for processing character data, comprising:
a character data processing apparatus configured to generate print data; and
a printer configured to receive the print data from the character data processing apparatus via a network, and to generate the printed output of the print data, wherein
the character data processing apparatus includes:
a user interface configured to receive a user instruction for printing the character data according to character command data specifying the output of the character data;
a processor; and
a storage device configured to store a plurality of instructions which causes the processor to:
select a type of processing to be performed based on processing type information stored in a memory;
extract information from the character command data, the extracted information corresponding to the selected type of processing;
select a format of the character data to be used for generating the output of the character data by performing the selected type of processing using the extracted information of the character command data;
request the character data having the selected format;
obtain the character data having the selected format;
convert the character data having the selected format according to the character command data to generate converted character data having the selected format;
generate the print data including the converted character data having the selected format; and
store processing type information, the processing type information specifying one of scale-based processing, threshold-based processing, and property-based processing, and wherein the plurality of instructions is further configured to cause the character data processing apparatus to:
select one of scale ratio information, character size information, and character property information of the character command data based on the selected type of processing that is specified by the processing type information, wherein
when the scale-based processing is selected, the scale ratio information is extracted from the character command data to be used for selecting a format of the character data,
when the threshold-based processing is selected, the character size information is extracted from the character commend data to be used for selecting a format of the character data, and
when the property-based processing is selected, the character property information is extracted from the character command data to be used for selecting a format of the character data.

12. The system of claim 11, wherein the plurality of instructions is configured to further cause the processor to:
generate intermediate data including the character data and the character command data, the character data including at least two types of character data;
store the intermediate data in a memory;
modify the character command data of the intermediate data being stored in the memory to generate modified character command data according to a user input specifying the change to the character command data;
select a format of the character data to be used for generating the output of the character data by performing the selected type of processing using information extracted from the modified character command data, the extracted information corresponding to the selected type of processing; and
request one type of the character data having the selected format.

13. The system of claim 11, wherein the character command data comprises:
scale ratio information specifying the scaling factor to be applied to the character data;
character size information specifying at least one of the width of the character in the converted character data and the height of the character in the converted character data; and
character property information specifying the style of the character in the converted character data.

14. The system of claim 11, wherein the character data processing apparatus further comprises:
a first converter configured to convert the character data having a first format to the converted character data having the first format;
a second converter configured to convert the character data having a second format to the converted character data having the second format, wherein the plurality of instructions is further configured to cause the processor to:
select one of the first converter and the second converter based on the selected format, wherein
the character data having the selected format is converted to the converted character data having the selected format according to the character command data using the selected one of the first converter and the second converter.

* * * * *